(12) United States Patent
Bilic et al.

(10) Patent No.: US 10,974,939 B2
(45) Date of Patent: Apr. 13, 2021

(54) INDUCTOR TO CONTROL TRANSIENT CURRENTS DURING ENERGIZED BOND ON

(71) Applicant: Quanta Associates, L.P., Houston, TX (US)

(72) Inventors: Zoran Bilic, Winnipeg (CA); David James Ball, La Grange, TX (US)

(73) Assignee: Quanta Associates, L.P., Houston, TX (US)

( * ) Notice: Subject to any disclaimer, the term of this patent is extended or adjusted under 35 U.S.C. 154(b) by 342 days.

(21) Appl. No.: 16/185,433

(22) Filed: Nov. 9, 2018

(65) Prior Publication Data

US 2019/0135603 A1     May 9, 2019

Related U.S. Application Data

(60) Provisional application No. 62/584,003, filed on Nov. 9, 2017, provisional application No. 62/585,291, filed on Nov. 13, 2017.

(30) Foreign Application Priority Data

Nov. 10, 2017   (CA) ....................................... 2985281
Nov. 14, 2017   (CA) ....................................... 2985262

(51) Int. Cl.
| | | |
|---|---|---|
| *B66F 17/00* | (2006.01) |
| *H02G 1/02* | (2006.01) |
| *B66F 11/04* | (2006.01) |
| *H01F 27/28* | (2006.01) |
| *H01F 37/00* | (2006.01) |

(52) U.S. Cl.
CPC .......... *B66F 17/006* (2013.01); *B66F 11/046* (2013.01); *H02G 1/02* (2013.01); *B66F 11/044* (2013.01); *H01F 27/2847* (2013.01); *H01F 37/005* (2013.01)

(58) Field of Classification Search
CPC combination set(s) only.
See application file for complete search history.

(56) References Cited

U.S. PATENT DOCUMENTS

| | | | |
|---|---|---|---|
| 2,541,788 A | | 2/1951 | Stover |
| 2,789,282 A | * | 4/1957 | Winters ................ B66C 15/065 340/660 |
| 3,139,948 A | * | 7/1964 | Rorden ................. B66F 11/044 182/2.4 |

(Continued)

OTHER PUBLICATIONS

Young, Lee W., International Search Report for PCT/US2018/059997, dated Feb. 1, 2019, 2 pages, ISA/US, Alexandria, Virginia.

(Continued)

*Primary Examiner* — William H. Mayo, III
*Assistant Examiner* — Krystal Robinson
(74) *Attorney, Agent, or Firm* — Oathout Law Firm; Mark A. Oathout; Antony C. Edwards

(57) ABSTRACT

A system and method using at least one inductor operatively coupled to an electrically insulating structure suppresses transient currents generated during a bond-on process by a human worker with energized electrical equipment so as to inhibit passage of the transient currents through the electrically insulating structure operatively coupled to the energized electrical equipment.

15 Claims, 5 Drawing Sheets

(56) References Cited

U.S. PATENT DOCUMENTS

| | | | | |
|---|---|---|---|---|
| 3,320,524 | A | * | 5/1967 | Miller, Jr. .............. H02G 1/02 324/557 |
| 3,990,551 | A | * | 11/1976 | Jamison .............. B65H 75/362 191/12 R |
| 4,064,997 | A | * | 12/1977 | Holland .............. B66C 15/065 212/280 |
| 4,191,986 | A | | 3/1980 | ta Huang et al. |
| 4,649,375 | A | * | 3/1987 | Duppong .............. G01R 19/145 212/280 |
| 4,877,422 | A | * | 10/1989 | Walbridge .............. B01D 53/26 95/25 |
| 5,184,696 | A | * | 2/1993 | Meed .............. A62B 35/0068 182/133 |
| 5,296,844 | A | * | 3/1994 | Hanrahan .............. G01R 19/155 182/230 |
| 6,170,607 | B1 | | 1/2001 | Freeman et al. |
| 6,265,983 | B1 | * | 7/2001 | Baillargeon .............. A62B 35/0037 340/673 |
| 6,600,426 | B1 | * | 7/2003 | Sacks .............. B60P 1/00 340/664 |
| 6,769,514 | B2 | | 8/2004 | Ed |
| 7,748,496 | B2 | * | 7/2010 | Higgins .............. B66F 11/044 182/2.4 |
| 8,786,995 | B2 | | 7/2014 | Koch et al. |
| 9,870,853 | B1 | * | 1/2018 | Patterson .............. H01F 29/00 |
| 10,338,107 | B1 | * | 7/2019 | Beck .............. B66C 15/065 |
| 2003/0213644 | A1 | | 11/2003 | Chard et al. |
| 2009/0108840 | A1 | * | 4/2009 | Givens .............. G01R 29/085 324/251 |
| 2011/0253662 | A1 | * | 10/2011 | Stander .............. B66C 23/88 212/281 |
| 2016/0356826 | A1 | * | 12/2016 | Ball .............. G01R 31/1245 |

OTHER PUBLICATIONS

Young, Lee W., Written Opinion of the International Searching Authority for PCT/US2018/059997, dated Feb. 1, 2019 4 pages, ISA/US, Alexandria, Virginia.

Looms, J.S.T, "Live working on high-voltage lines", IEE Proceedings A (Physical Science, Measurement and Instrumentation, Management and Education, Reviews), Mar. 1981, p. 89-106, vol. 128, Issue 2, The Institution of Electrical Engineers, United Kingdom.

Tianyou Li, Qiujin Lin,Genghuang Chen, "Live-Line Operation and Maintenance of Power Distribution Networks", Jun. 12, 2017, John Wiley & Sons Singapore Pte. Ltd., Singapore.

Pietro Martini, "Live-Line Working and Evaluation Risk on 400kV Transmission Line", Thesis submitted to the School of Electrical and Electronic Engineering, 2017, p. 1-197, University of Manchester, United Kingdom.

Liao et al., "Research on Helicopter Live-Line Work by Platform Method on 1000 kV UHV AC Transmission Lines", IEEE Transactions on Magnetics, Apr. 23, 2015, p. 1-4, vol. 51, Issue 3, IEEE, United States of America.

CPA Global, Non-Patent Literature Search Report for Inductor to Control Transient Currents During Energized Bond On, dated Oct. 4, 2018, 1 page, CPA Global, United States of America.

* cited by examiner

INDUCTOR TO CONTROL TRANSIENT CURRENTS DURING ENERGIZED BOND ON

CROSS-REFERENCE TO RELATED APPLICATIONS

This application claims priority from United States Provisional Patent Application Nos. 62/584,003 filed on Nov. 9, 2017 and 62/585,291 filed on Nov. 13, 2017 and Canadian Patent Application Nos. 2,985,281 filed on Nov. 10, 2017 and U.S. Pat. No. 2,985,262 filed on Nov. 14, 2017, all entitled, "Inductor To Control Transient Currents During Energized Bond On". Entireties of all the applications identified in this section are incorporated herein by reference.

FIELD

Embodiments described herein generally relate to a system and method for use with high voltage power systems such as high voltage alternating current (AC) power systems or high voltage direct current (HVDC) power systems. More particularly, embodiments described herein relate to a system and method for controlling transient currents generated during an energized bond-on process with such power systems by a human worker.

BACKGROUND

Live-line working, also known as hotline maintenance, is the maintenance of electrical equipment such as conductors, often operating at high voltage, while the equipment is energized. In most cases, the electrical equipment is a high voltage AC or DC power system which is in an overhead position. Live-line working is more efficient because the electrical equipment does not need to be shut off while the maintenance is being performed on the electrical equipment. There are several methods for carrying out live-line working. All these methods prevent current from the live electrical equipment/live parts(s) flowing through a human worker working on the live equipment. One such method is the equipotential method, which is commonly referred to in the industry as the "barehand method". In the barehand method, a worker is in direct electric contact with live electrical equipment. Before contact, the worker's body is raised to the same electric potential as the live electrical equipment, and is then held at that potential by electric connection, while maintaining suitable insulation from the surroundings which are at different potentials, like the ground, adjacent the electrical equipment. Because the worker and the live electrical equipment are at the same potential, no current flows through the worker.

The worker can be placed in the vicinity of the overhead live electrical equipment in a number of ways. One way includes placing the worker in the vicinity of the live electrical equipment through an insulating structure. The insulating structure may be a ladder, scaffolding or an aerial lift platform such as the bucket of a bucket truck for containing and delivering workers to a height of the energized electrical equipment. The insulating structure insulates the worker from ground potential.

Conventionally an aerial lift platform may include a bucket which is mounted to a truck, vehicle, or trailer chassis via a boom. The worker is located on the aerial platform, for example within the bucket. During operation, the boom is extended such that the bucket, and in turn the worker, resides besides an overhead energized electrical equipment requiring maintenance so that the worker in the bucket can perform maintenance on the energized electrical equipment. Typically the boom has multiple sections to allow added height and articulation of the bucket and only the final section of the boom connected to the bucket is insulated or made of a high strength insulating material such as fiberglass or other non-conductive or dielectric material. Thus, all sections of the boom below the final dielectric section may be made of a conductive material such as steel.

As the worker approaches the overhead energized electrical equipment, for example in the bucket of a bucket truck, an arc forms between the worker and the energized electrical equipment as the worker is being charged to the same potential as the electrical equipment. This arc can be debilitating, so the worker must immediately electrically bond to the energized electrical equipment to prevent further arcing. Typically, a conducting wand is used by the worker, during the approach, to make the electrical connection with the energized electrical equipment so as to bring the worker to the same potential as the energized electrical equipment. When the bucket and the energized electrical equipment are close enough such that the worker can work on the energized electrical equipment, the worker, who is already at a common potential with the energized electrical equipment, installs an electrical link such as a bonding clamp between the bucket and the energized electrical equipment so as to bring the bucket to the same potential as the energized electrical equipment. This bonding between the bucket and the energized electrical equipment is done because the buckets that are typically used for high voltage energized applications are metal lined or contain metallic elements to provide a Faraday cage or electrostatic screen.

It has been observed that bonding on to the energized electrical equipment creates an initial surge or transient in the current flowing through the energized electrical equipment. The transient may be described as a "hammer" of in-rush current. It has been further observed that the surge or transient only occurs during the bond-on process. Once the worker and the energized electrical equipment are at the common potential, the surge or transient disappears.

Based on testing, Applicant believes that the amplitude and wave shape of this initial current surge is directly related to the resistance of the insulating structure enabling the worker to reach the overhead energized electrical equipment. As one skilled in the art will understand, insulators tend to deteriorate over a period of time. Applicant believes that one of the main causes for insulator deterioration is dielectric contamination. Outdoor insulators are continuously exposed to the environment. Consequently, contaminants such as salt, dust, sand and other industrial pollutants tend to deposit or build-up on the insulator surface as a dry layer. The dry contaminant layer becomes conductive under light wetting conditions such as light rain or morning dew thereby reducing the dielectric performance of the insulator. It has been observed that when the resistance of the insulating structure or dielectric performance of the insulating structure is high, the amplitude of the transient surge is low. It has been further observed that when the resistance of the insulating structure or dielectric performance of the insulating structure is low, the amplitude of the transient surge was quite high. During laboratory testing, it was observed that the transient could have an amplitude of higher than 5 A and could last for 10 usec or less.

Applicant has noted that this phenomenon occurs in both AC and DC power systems. However, Applicant believes that because of the nature of DC power systems, this phenomenon may be substantially more dangerous in DC systems. In DC systems, because the voltage is constant, the bond-on will always occur at peak voltage. Further, because the voltage is constant and since it has been observed that the transient current could last for a few microseconds, it is quite possible that the transient current will not be contained to the area of the insulating structure closest to the worker but could flow through the entire length of the insulating structure.

Further, if the insulating structure is already in a compromised condition and if the transient current is of sufficiently high amplitude and duration, Applicant believes that the transient current could cause a complete failure of the insulating structure.

Applicant is not aware of any systems for countering or deflecting the transient current through the insulating structure generated during the bond-on process. This phenomenon is currently accepted in the industry as a risk.

Applicant is aware of surge arresters that protect an electronic device connected to an AC power line from an in-rush current. One such surge arrester is described in U.S. Pat. No. 8,786,995 to Koch et al.

SUMMARY

Embodiments described herein relate to a system which mitigates the effects of transient currents, generated during bond-on with energized electrical equipment by a human worker, on an insulating structure.

Accordingly, in one aspect a system for use with overhead energized electrical equipment for controlling transient currents generated during bond-on with the energized electrical equipment by a human worker is provided. The system comprises an electrically insulating structure adapted to carry the worker at a first end of the electrically insulating structure and to position the worker adjacent the energized electrical equipment. The system further comprises at least one inductor operatively coupled to the first end of the electrically insulating structure. In use, when the worker is positioned adjacent the energized electrical equipment and is bonding-on to the energized electrical equipment for achieving a common potential with the energized electrical equipment, the at least one inductor suppresses transient currents from the energized electrical equipment to thereby inhibit propagation of the transient currents through the insulating structure.

Accordingly, in another aspect a method for controlling transient currents generated during bond-on with overhead energized electrical equipment by a human worker using the system described above is provided. The method comprises using the electrically insulating structure, carrying and positioning the worker adjacent the energized electrical equipment. The method further comprises bonding-on the worker to the energized electrical equipment, whereby the at least one inductor suppresses the transient currents from the energized electrical equipment so as to inhibit propagation of the transient currents through the insulating structure.

DETAILED DESCRIPTION

Figure 1:
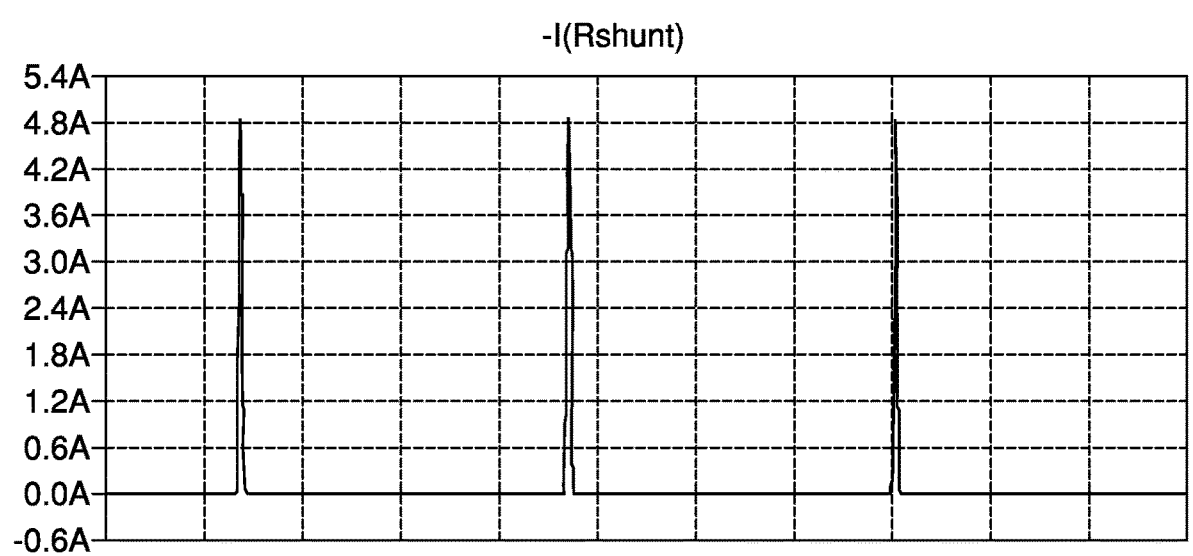
FIG. 1 is graph depicting an example of the amplitude and frequency of transient currents generated during a bond-on process with an energized electrical equipment by a human worker.

As described in the foregoing paragraphs, Applicant has observed that during live-line working on energized electrical equipment, transient currents are generated when a human worker initially bonds-on to the energized electrical equipment. FIG. 1 depicts an example of the amplitude and frequency of such transient currents.

Embodiments described herein depict and describe the energized electrical equipment as an overhead energized power line or conductor and the insulating structure as the dielectric section or sections of a boom connected to an aerial lift platform such as a bucket and bucket-lift system. However, a person skilled in the art will understand that the energized electrical equipment may include components other than power lines such as static lines, optical ground wires (OPGWs) or substation bus pipes and couplings or couplers associated with lines, wires or pipes. Couplings may include, but are not limited to, compression sleeves which join ends of two power lines together or dead-ends or dead end connectors which are used to attach power lines to supporting structures such as support towers or poles.

Also, the insulating structure may be an insulating scaffolding or a ladder on for example a ladder truck which enables a worker to be placed or positioned in the vicinity or adjacent an overhead energized electrical equipment for conducting live-line work on the electrical equipment. Such insulating ladders or scaffoldings are described and depicted respectively in FIGS. 6 and 7 of Applicant's US Patent Application Publication No. 2016/0356826.

The system and method described herein may be used for controlling, countering, or deflecting transient currents in high voltage AC power systems or high voltage DC power systems.

Figure 2:
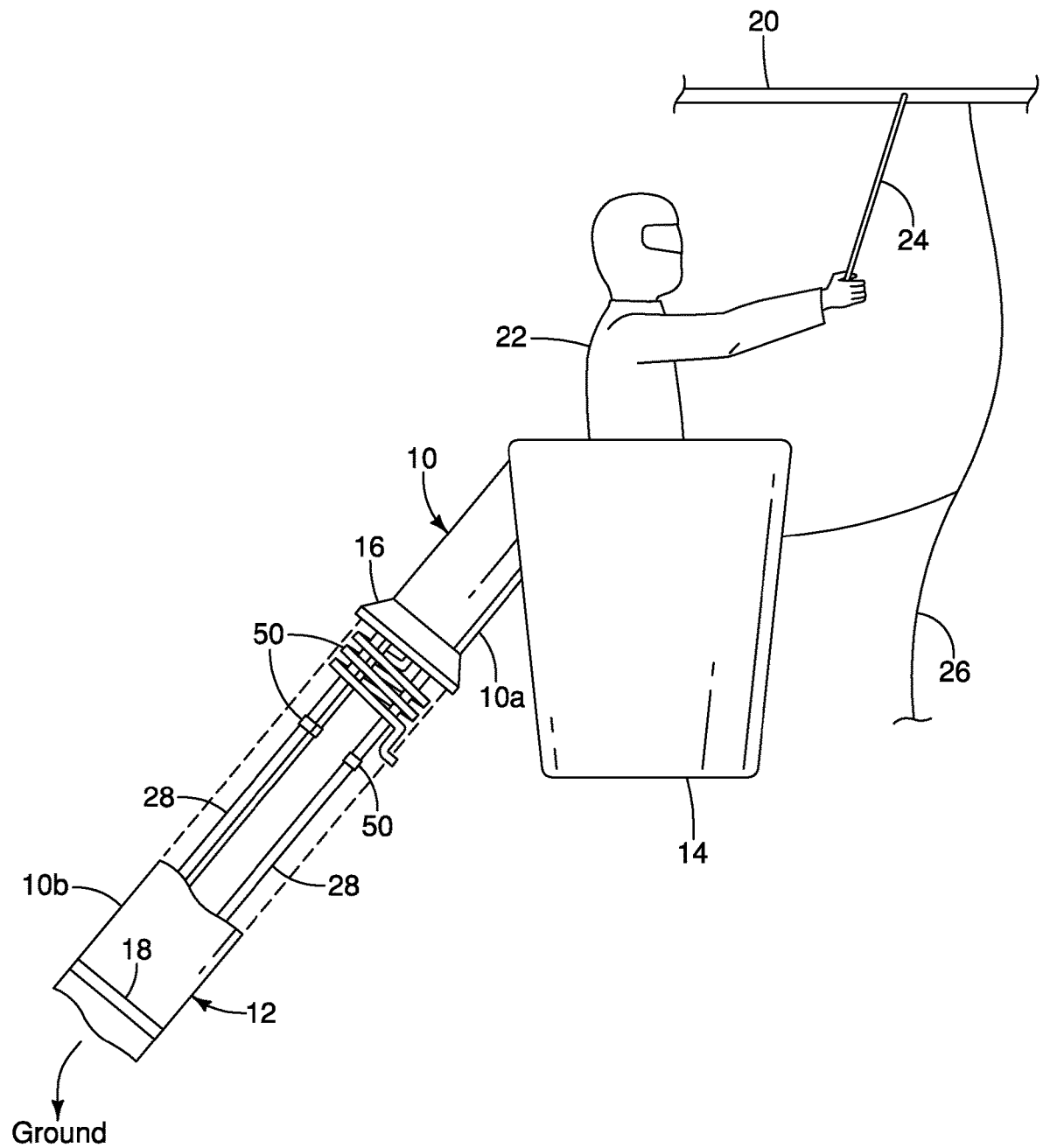
FIG. 2 is a schematic illustration of a bond-on process, the figure illustrating one embodiment of the system described herein.
Figure 3:
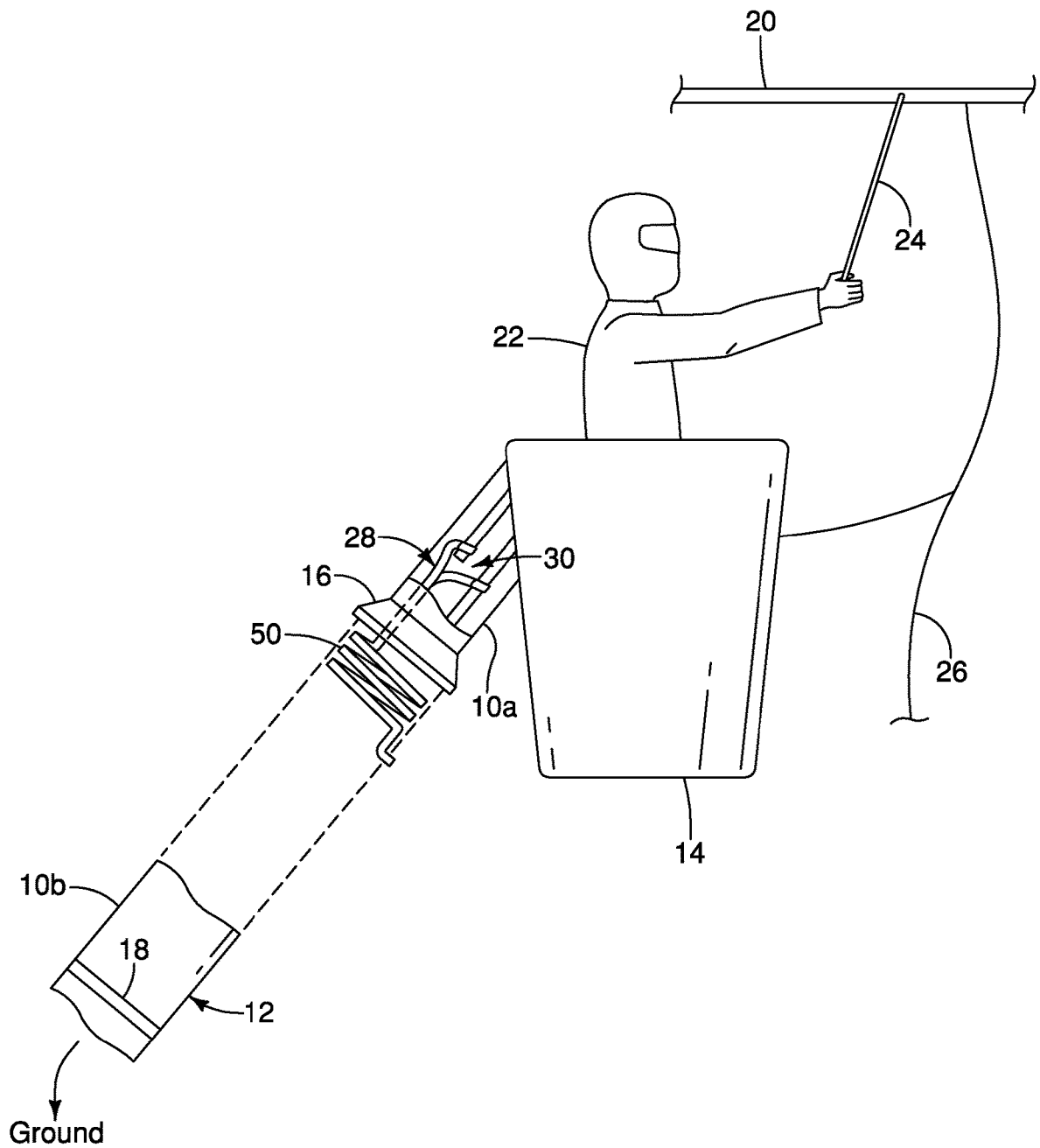
FIG. 3 is a schematic illustration of another embodiment of the system described herein.
Figure 4:
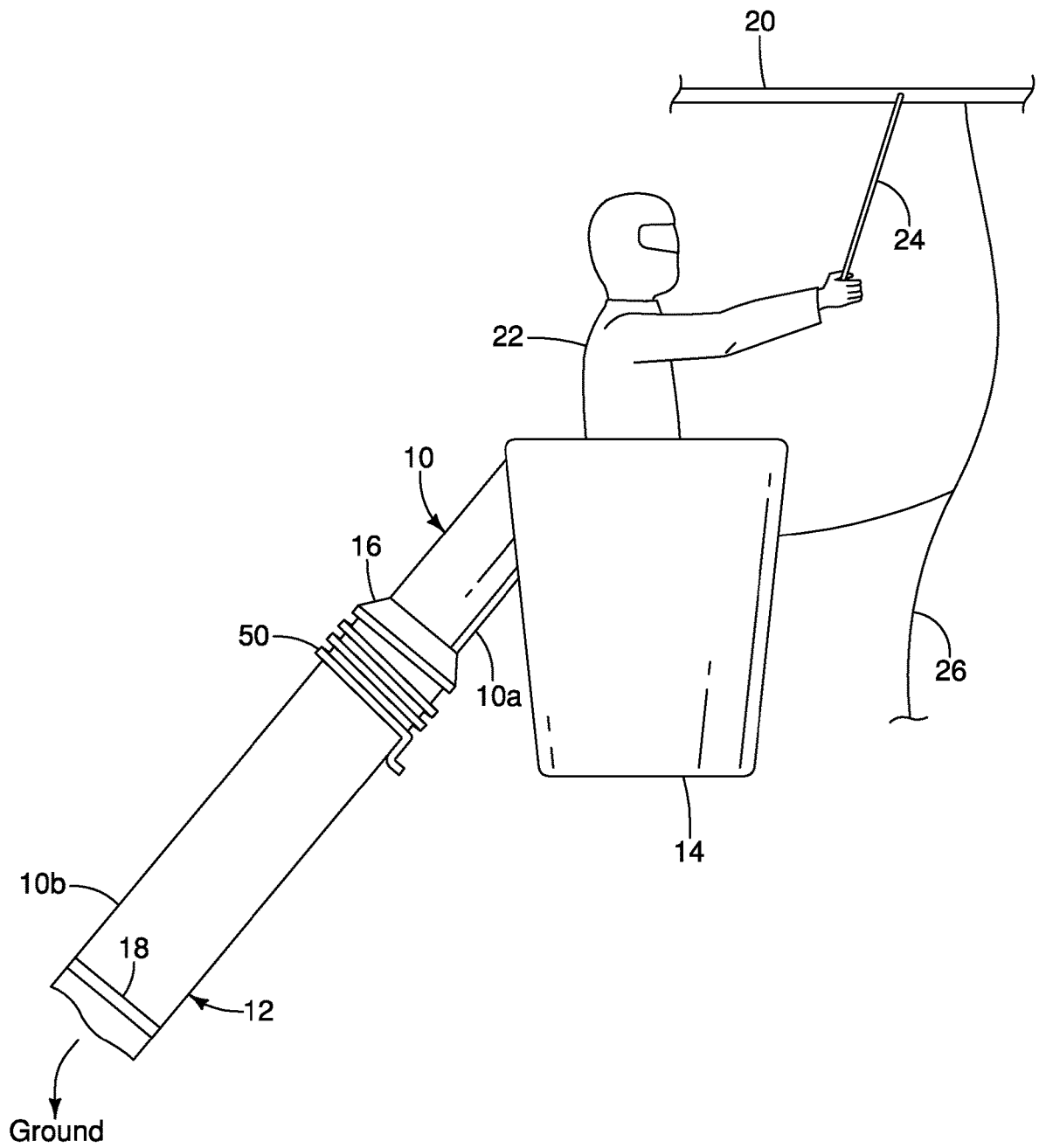
FIG. 4 is a schematic illustration of yet another embodiment of the system described herein.

As seen in FIGS. 2 to 4, in one embodiment, the insulating structure is an insulated section 10 of a boom 12. The insulated section is made of a high strength dielectric or non-electrically conductive material such as fiber reinforced plastic (FRP). The insulated section 10 is connected to an aerial lift platform such as a bucket 14 at one end 10a. The insulated section 10 is connected at its second 10b to a lift system such as on a boom truck (not shown). In one embodiment, the second end 10b is connected to the truck through one or more sections, such as boom sections made of an electrically conductive material such as steel. These electrically conductive sections of the boom have not been depicted in the accompanying drawings, as they are well known in the prior art. A corona ring 16 may be attached proximate to end 10a of the insulated boom section 10 and an exterior collector band 18 may be attached proximate to end 10b of the insulated boom section 10.

In the embodiments depicted in the accompanying drawings, the overhead energized electrical equipment needing maintenance is an energized transmission power line or conductor 20. Since the embodiments described herein are high voltage applications, the bucket 14 is preferably metal lined to provide an electrostatic screen. During operation, human worker 22 is located within the bucket and the boom 12 is extended so as to position the human worker 22 adjacent the energized transmission power line 20. In one embodiment, the energized transmission power line is a DC electrical power line having a voltage between 10,000 volts to 600,000 volts. In order to bring the worker 22 to the same potential as the energized power line 20, the worker 22 establishes an electrical connection with the energized power line 20 using a bonding wand 24. Further, after the worker 22 brings himself within a suitable working distance of the energized power line, the worker, who is now at the same potential as the energized power line 20, brings the bucket 14 to the same potential as the energized power line 20 by installing an electrical link such as a bonding clamp 26 between the bucket 14 and the energized power line 20.

As explained in the background, during bond-on with the energized power line, transient currents are generated. In order to control or counter these transients, in one embodiment and with reference to FIGS. 2 to 4, at least one inductor is operatively coupled to at least the insulated section 10 of the boom. The inductor arrests or suppresses the transient currents thereby inhibiting the transient currents from propagating through the insulated section 10 of the boom. As one skilled in the art will understand, an inductor resists any change in current due its self-inductance. Since the transient currents generated during an energized bond-on are a change in current, the inductor will resist this change. The at least one inductor will resist the transient currents and will suppress the transient currents. After the transient currents die down, the inductor will have a low resistance to the steady currents flowing through the energized power line 20. The suppression of the transient currents by the inductor inhibits propagation of the transient currents through the insulated section 10 of the boom 12 thereby preventing complete breakdown of the insulated section 10 of the boom 12 and maintaining integrity of the insulated boom section 10.

The Applicant has contemplated various ways for operatively coupling the at least one inductor to the insulated boom section 10 of the boom 12.

In one embodiment and with reference to FIG. 2, the insulated boom section 10 is a hollow boom section housing one or more operating components 24 such as a leveling rod, hydraulic line or fiber optic cable. Each of the one or more operating components 24 is also operatively coupled to the bucket 14. In this embodiment, each operating component 24 is associated with an inductor 50. The inductor 50 is placed in series with the operating component 24, between the operating component 24 and the bucket 14.

In another embodiment and with reference to FIG. 3, again the insulated boom section 10 is a hollow boom section housing a plurality of operating components 24. In this embodiment, the plurality of operating components 24 is connected together at a connection point 30 and the inductor 50 is positioned so as to be in series with the connection point 30, between the connection point 30 and the bucket 14.

In another embodiment and with reference to FIG. 4, the insulated boom section 10 is a solid or hollow boom section with no operating components housed therein. In this embodiment, the inductor 50 is positioned so as to be placed operatively coupled to the insulated section at its end 10a.

As one skilled in the art will understand, an inductor is a coil of wire, which through the turns in the wire creates an inductance that resists changes in current. As such the inductor 50 described herein may be constructed using a cooper wire of sufficient gauge and turns. In one embodiment, the inductor 50 may be an air core inductor. In another embodiment, the inductor may be a flat conductor.

In the embodiment of FIG. 4, the inductor 50 may be mounted or laminated onto an outer surface of the insulated boom section 10 at its end 10a.

Further, as one skilled in the art will appreciate, selection of the inductor 50 will depend on the voltage of the energized electrical equipment. For example, based on testing, it has been determined that when the energized DC electrical power line has a voltage between 200,000 volts to 500,000 volts, an inductor having an inductance of 100 µH (Microhenries) or above reduces the transient currents generated during energized bond-on by at least a factor of ten or greater depending upon the inductance of the inductor.

Figure 5:
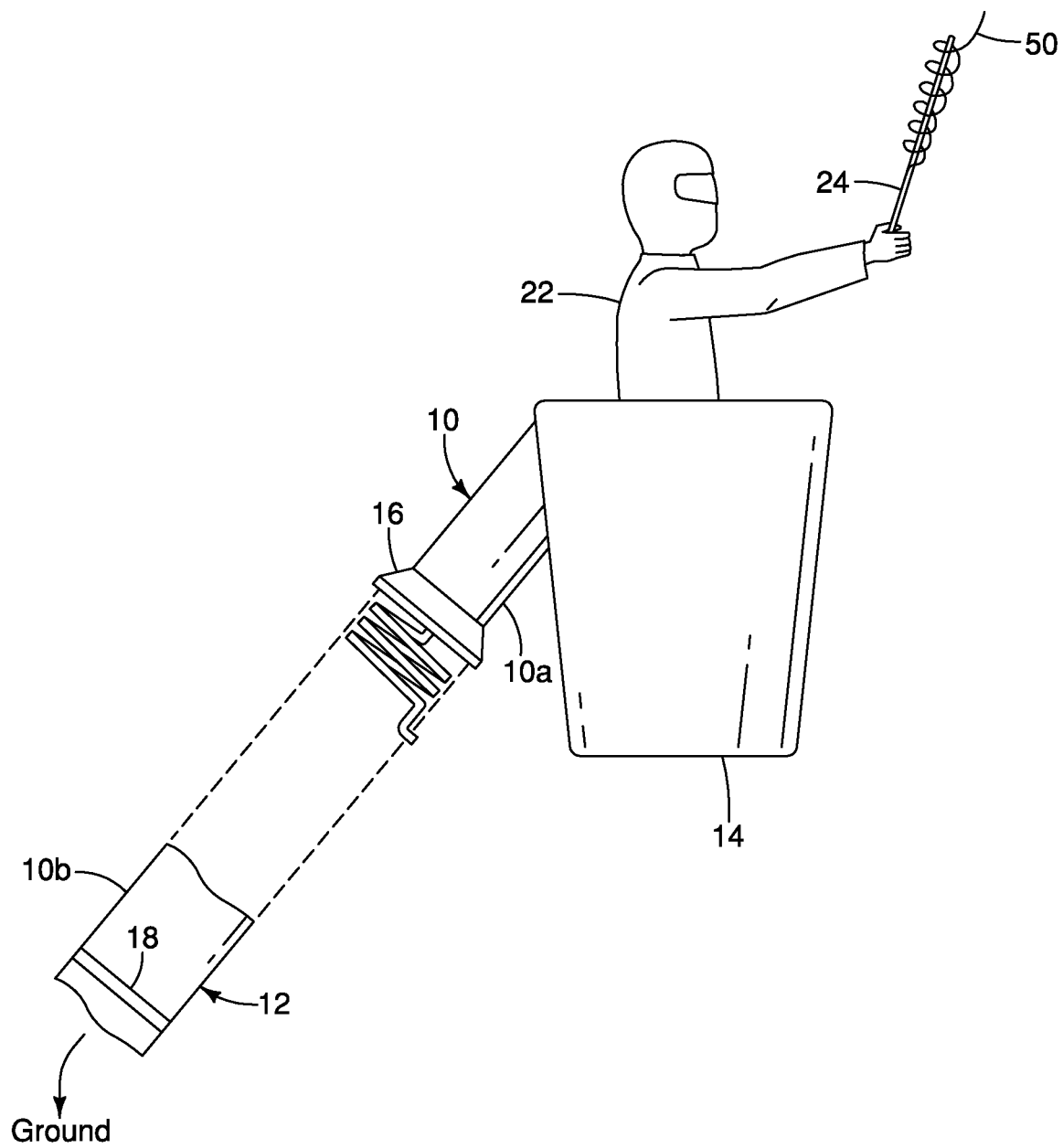
FIG. 5 is a schematic illustration of a further embodiment of the system described herein.

In another embodiment and with reference to FIG. 5, Applicant has contemplated incorporating the inductor 50 in the bonding wand 24 so as to suppress the transients. Typically, a bonding wand includes a conductive hook and an insulated gripping portion. The conductive hook is connected to the basket 14 by a cable (not shown). In the contemplated embodiment, the inductor 50 is placed in series with the conductive hook, between the conductive hook and the gripping portion.

In use, the boom 12 including its insulated section 10 is manipulated so as to position the insulated section 10, bucket 14 and worker 22 adjacent the energized power line 20. The insulated section 10 is or has been operatively coupled to an inductor 50 using one or a combination of the arrangements described above. The worker 22 is brought to the voltage potential of the energized power line 20 by the worker 22 contacting the energized power line 20 with for example a bonding wand 24 and attaching the bonding clamp 26 between the energized power line 20 and the bucket 14. During the bonding-on process, the inductor 50 suppresses the transient currents generated and thereby inhibits propagation of the transient currents through the insulating section 10 of the boom 12.

The invention claimed is:

1. A system for use with overhead energized electrical equipment for controlling transient currents generated during bond-on with the energized electrical equipment by a human worker, the system comprising: an electrically insulating structure adapted to carry the worker at a first end of the electrically insulating structure and to position the worker adjacent the energized electrical equipment; at least one inductor operatively coupled to the first end of the electrically insulating structure; and wherein, in use, when the worker is positioned adjacent the energized electrical equipment and is bonding-on to the energized electrical equipment for achieving a common potential with the energized electrical equipment, the at least one inductor suppresses transient currents from the energized electrical equipment to thereby inhibit propagation of the transient currents through the insulating structure.

2. The system of claim 1, wherein the insulating structure includes at least one insulated section of a boom connected to an aerial lift platform at the first end and connected to a lift system via a second end, and wherein the at least one inductor is operatively coupled to the at least one insulated section at the first end.

3. The system of claim 2, wherein the operating component is a hydraulic line, a levelling rod or a fiber optic cable.

4. The system of claim 2, wherein the at least one inductor is a flat conductor.

5. The system of claim 4, wherein the at least one inductor is laminated onto an outer surface of the at least one insulated section at the first end.

6. The system of claim 1, wherein the insulating structure includes at least one insulated section of a boom connected to an aerial lift platform at the first end and connected to a lift system via a second end, the at least one insulated section housing at least one operating component which is operatively coupled to the aerial lift platform, and wherein the at least one inductor is placed in series with the at least one operating component.

7. The system of claim 1, wherein the insulating structure includes at least one insulated section of a boom connected to an aerial lift platform at the first end and connected to a lift system via a second end, the at least one insulated section housing a plurality of operating components which are connected to the aerial lift platform through a connection point and wherein the at least one inductor is placed in series with the connection point.

8. The system of claim 1, wherein the energized electrical equipment is an energized DC electrical power line having a voltage between 10,000 volts to 600,000 volts, inclusive.

9. The system of claim 8, wherein when the energized DC electrical power line has a voltage between 200,000 volts to 500,000 volts, an inductance of the at least one inductor is at least 100 Microhenries.

10. The system of claim 1, wherein the at least one inductor is an air core inductor.

11. A method for controlling transient currents generated during bond-on with overhead energized electrical equipment by a human worker using the system of claim 1, the method comprising: using the electrically insulating structure, carrying and positioning the worker adjacent the energized electrical equipment; bonding-on the worker to the energized electrical equipment, whereby the at least one inductor suppresses the transient currents from the energized electrical equipment so as to inhibit propagation of the transient currents through the insulating structure.

12. The method of claim 11, wherein the electrically insulating structure includes at least one insulated section of a boom connected to an aerial lift platform at the first end and connected to a lift system via a second end, and wherein the operatively coupling comprises operatively coupling the at least one inductor to the at least one insulated section at the first end.

13. The method of claim 11, wherein the insulating structure includes at least one insulated section of a boom connected to an aerial lift platform at the first end and connected to a lift system via a second end, the at least one insulated section housing at least one operating component which is operatively coupled to the aerial lift platform, and wherein the operatively coupling comprises placing the at least one inductor in series with the at least one operating component.

14. The method of claim 11, wherein the insulating structure includes at least one insulated section of a boom connected to an aerial lift platform at the first end and connected to a lift system via a second end, the at least one insulated section housing a plurality of operating components which are connected to the aerial lift platform through a connection point, and wherein the operatively coupling comprises placing the at least one inductor in series with the connection point.

15. The method of claim 11, wherein the insulating structure includes at least one insulated section of a boom connected to an aerial lift platform at the first end and connected to a lift system via a second end, the aerial platform including metal components, and wherein the step of bonding-on comprises the worker contacting the energized electrical equipment with a bonding wand and attaching an electrical link between the energized electrical equipment and the aerial lift platform.

* * * * *